United States Patent [19]

Howell

[11] 3,999,634

[45] Dec. 28, 1976

[54] PNEUMATIC ACTUATION FOR DISC BRAKE ASSEMBLIES

[75] Inventor: Robert V. Howell, Fort Worth, Tex.

[73] Assignee: Howell Industries, Inc., Fort Worth, Tex.

[22] Filed: Jan. 30, 1975

[21] Appl. No.: 545,753

Related U.S. Application Data

[63] Continuation-in-part of Ser. No. 432,943, Jan. 14, 1974, abandoned.

[52] U.S. Cl. .................. 188/71.6; 92/110; 92/152; 188/106 P; 188/264 CC; 188/264 E; 188/366; 192/85 AA
[51] Int. Cl.² ........................... F16D 65/853
[58] Field of Search ............ 188/71.5, 71.6, 106 P, 188/264 E, 366, 367, 369, 71.8, 264 D, 264 CC; 192/85 AA, 113 B; 92/107, 110, 152

[56] References Cited

UNITED STATES PATENTS

| 2,518,016 | 8/1950 | Johnson et al. | 188/264 E |
|---|---|---|---|
| 2,535,763 | 12/1950 | Tucker | 188/366 |
| 2,655,236 | 10/1953 | Bachman | 188/71.6 |
| 2,915,146 | 12/1959 | Lee et al. | 188/71.8 |
| 2,956,549 | 10/1960 | Malpass | 92/110 |
| 2,983,256 | 5/1961 | Seeloff | 92/110 |
| 3,480,115 | 11/1969 | Lallemont | 188/71.5 |

FOREIGN PATENTS OR APPLICATIONS

| 1,286,318 | 1/1962 | France | 192/113 B |
|---|---|---|---|
| 1,300,709 | 7/1962 | France | 188/366 |
| 651,876 | 4/1951 | United Kingdom | 188/264 E |
| 934,002 | 8/1963 | United Kingdom | 192/113 B |

Primary Examiner—Trygve M. Blix
Assistant Examiner—Edward R. Kazenske
Attorney, Agent, or Firm—Cushman, Darby & Cushman

[57] ABSTRACT

A heavy-duty disc brake assembly and pneumatic actuating assembly therefor. The pneumatic actuating assembly may include a pair of annular pistons operatively connected for simultaneous movement thereof, apparatus being provided for supplying air under pressure to the working faces thereof, or a single piston spring biased to braking position with apparatus for supplying air under pressure to either face thereof. The disc brake assembly includes a plurality of relatively movable rotor and stator discs, and preferably a closed cooling system with circulatory loop is provided.

13 Claims, 7 Drawing Figures

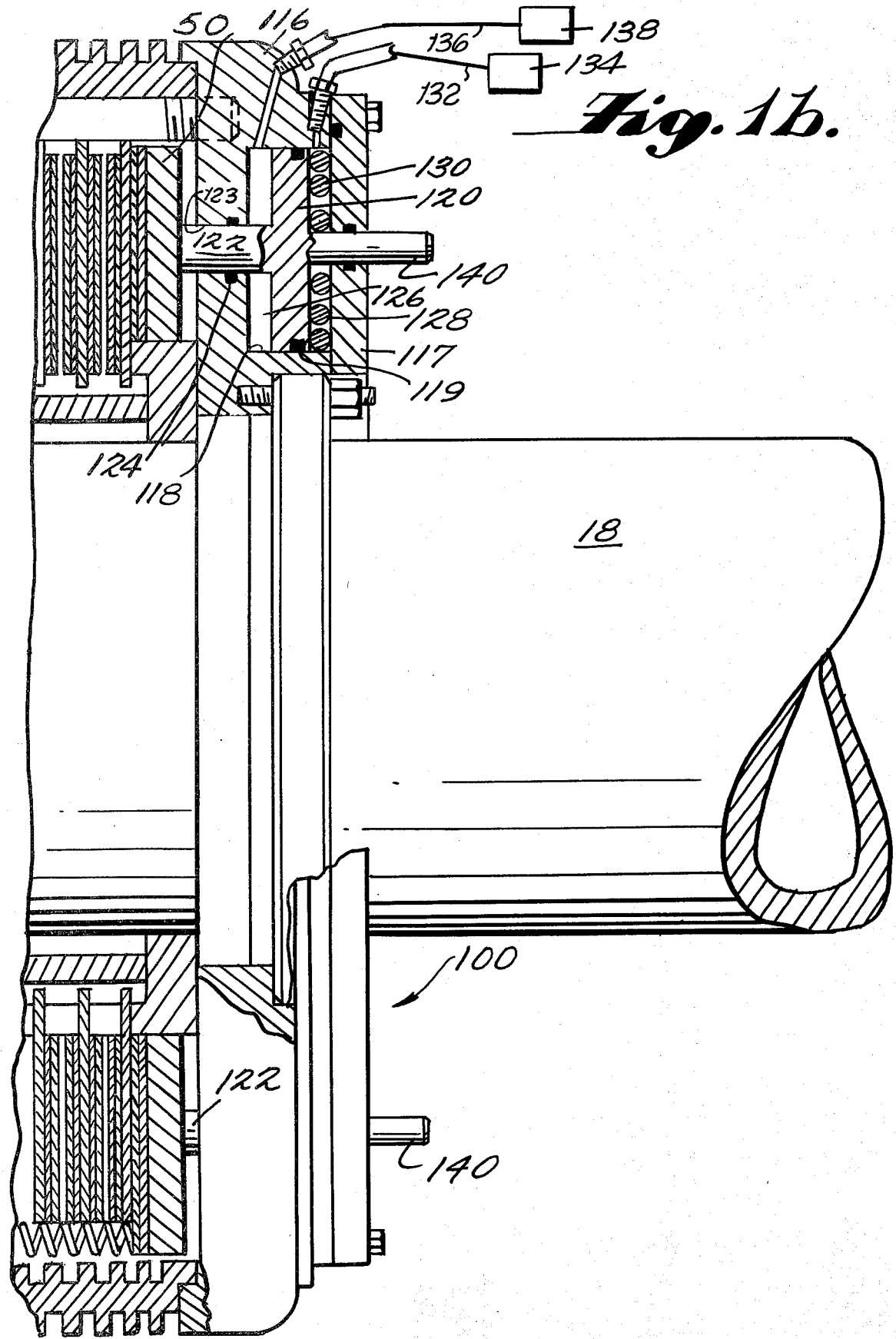

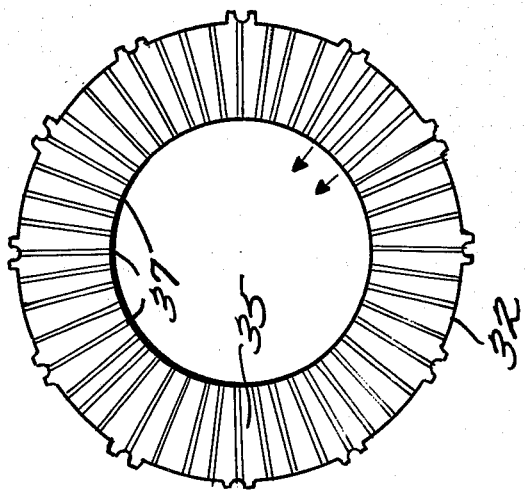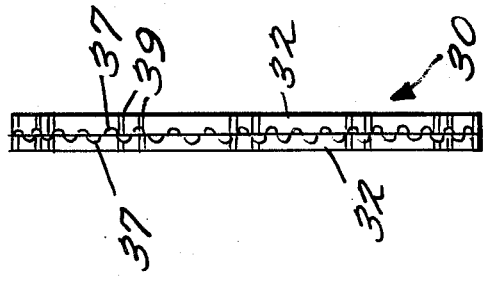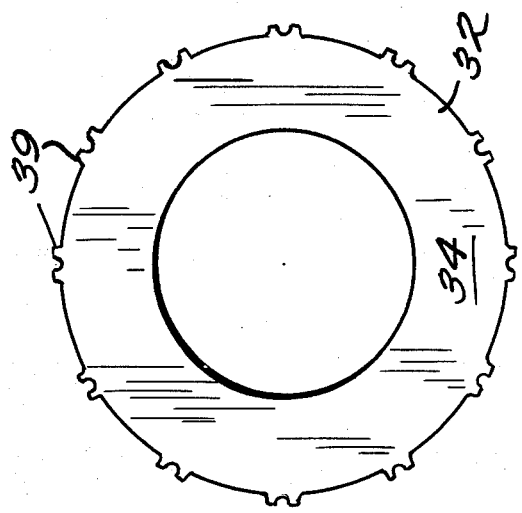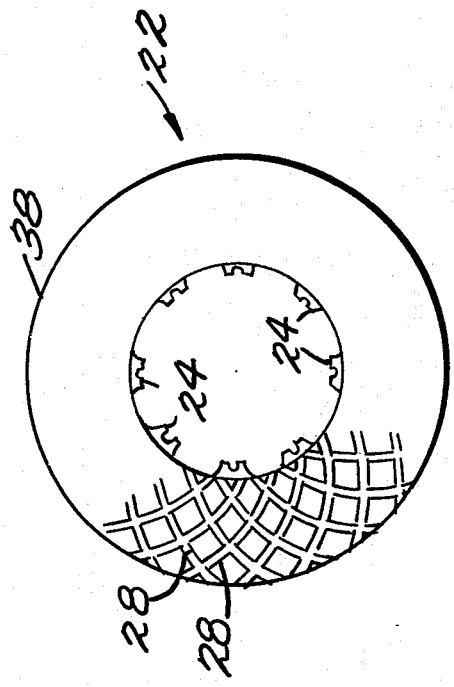

PNEUMATIC ACTUATION FOR DISC BRAKE ASSEMBLIES

CROSS REFERENCE TO RELATED APPLICATIONS

This application is a continuation-in-part of U.S. application Ser. No. 432,943, filed Jan. 14, 1974 now abandoned.

BACKGROUND AND SUMMARY OF THE INVENTION

The invention relates to the actuation of heavy-duty disc brakes, such as truck disc brakes, by pneumatic means. In the past it has not been practical to provide a purely pneumatic actuation system for truck disc brakes because of the large forces needed to be applied to provide sufficient braking, and because of the restraints on the size and disposition of such brake actuators when placed on a vehicle. Purely pneumatic actuation has many advantages, however. Since no special reservoir of fluid is necessary, fluid leakage is not nearly as important as in hydraulic systems, and much less often results in brake failure. Also maintenance needs are greatly reduced with purely pneumatic operating means, and they are less expensive to build.

Despite the many advantages of purely pneumatic operation, prior art heavy-duty truck disc brake actuators have been practically confined to hydraulic operation. Typical prior art fluid actuating means for disc brakes are shown in U.S. Pat. Nos. 2,915,146, 3,036,869 and 3,108,658. Hydraulic actuation has been required in such an environment because since the disc brake assembly must be mounted on an axle there is not enough room to provide for a pneumatic piston of large enough area to adequately operate heavy-duty disc brakes while still providing an assembly of proper size to be disposed on a truck axle. U.S. Pat. No. 3,680,666 suggests pneumatic actuation of a motor disc brake, but such an actuator has not found practical application in heavy-duty trucks in meeting the braking standards for trucks (particularly "lowboy" trucks) set forth in the Federal Regulations of Title 49, Chapter V, Part 571 — Federal Motor Vehicle Safety Standards, Air Brake Systems Standard and Hydraulic Brake Systems, as set forth in the Federal Register, Vol. 39, No. 97, May 17, 1974 and Vol. 37, No. 172, Sept. 2, 1972. According to the present invention, these standards can be met even with only pneumatic actuation of the brakes.

According to the present invention, a purely pneumatic actuator is provided with a heavy-duty disc brake assembly. Said actuator preferably comprises a first annular piston adapted to be disposed around a truck axle and having a pressurized air inlet on one side thereof, a vent in the cylinder behind the first piston, a second annular piston operatively connected to the first annular piston, an air inlet to one side of said piston being provided through a hollow member operatively connecting the first annular piston to the second annular piston, and said second piston being adapted to be disposed in operative engagement with discs of a heavy duty disc brake assembly. In this way, the effective area of a piston actuator for the disc brake assembly is greatly increased while the size of the assembly is increased only slightly, and that increase is along the length of an axle on which the brake assembly will be disposed rather than the width. While dual pistons per se have been known – see U.S. Pat. Nos. 2,956,549 and 2,983,256, for example – the combination of purely pneumatically operated annular dual pistons and a disc brake assembly, or the advantageous results achieved thereby, have not been known in the prior art.

Another exemplary pneumatic only actuating system comprising a single piston disc brake actuator biased closed by a spring and held open by air pressure and moved into positive braking position by air pressure, is also disclosed.

According to a preferred form of the invention, the pneumatic actuator is disposed on an improved self-contained oil-cooled heavy-duty disc brake assembly as is described in the parent application. The improved cooled disc brake assembly comprises a plurality of rotors having grooves on the surface thereof and a plurality of stators having passageways interiorly thereof, whereby a circulatory path of oil within the disc brake casing is established. The side portions of the casing of the assembly have heat-exchanging means formed thereon whereby oil from the casing is splattered on the casing side walls responsive to the centrifugal force of the rotors and quickly cooled. A self-pumping action is produced by the rotors – increased by the grooves formed in the surface thereof — and combined with the heat-exchanging means on the casing provides for self-contained cooling means for the disc brakes. The casing is provided with much less oil than the capacity thereof — preferably about one-third the oil it could contain — the oil being frothed during operation of the assembly and a thin layer of oil always being provided between the rotors and stators, whereby the life of the assembly is greatly extended over prior art devices.

It is a primary object of the present invention to provide an improved heavy-duty disc brake assembly with purely pneumatic actuation thereof. This and other objects of the invention will become clear from an inspection of the detailed description of the invention, and from the appended claims.

BRIEF DESCRIPTION OF THE DRAWINGS

FIG. 1b is a partial side view — partly in section and partly in elevation — of the disc brake assembly of FIG. 1a with another pneumatic actuator therefor;

FIG. 3 is an elevational view of the outside surface of an exemplary stator plate according to the present invention;

FIG. 4 is an elevational view of the inside surface of an exemplary stator plate according to the present invention;

FIG. 5 is an edge view of an exemplary stator according to the present invention, consisting of two stator plates with radial grooves terminating at the edge thereof; and FIG. 6 is an elevational view of an exemplary rotor according to the present invention.

DETAILED DESCRIPTION OF THE INVENTION

Figure 1A:
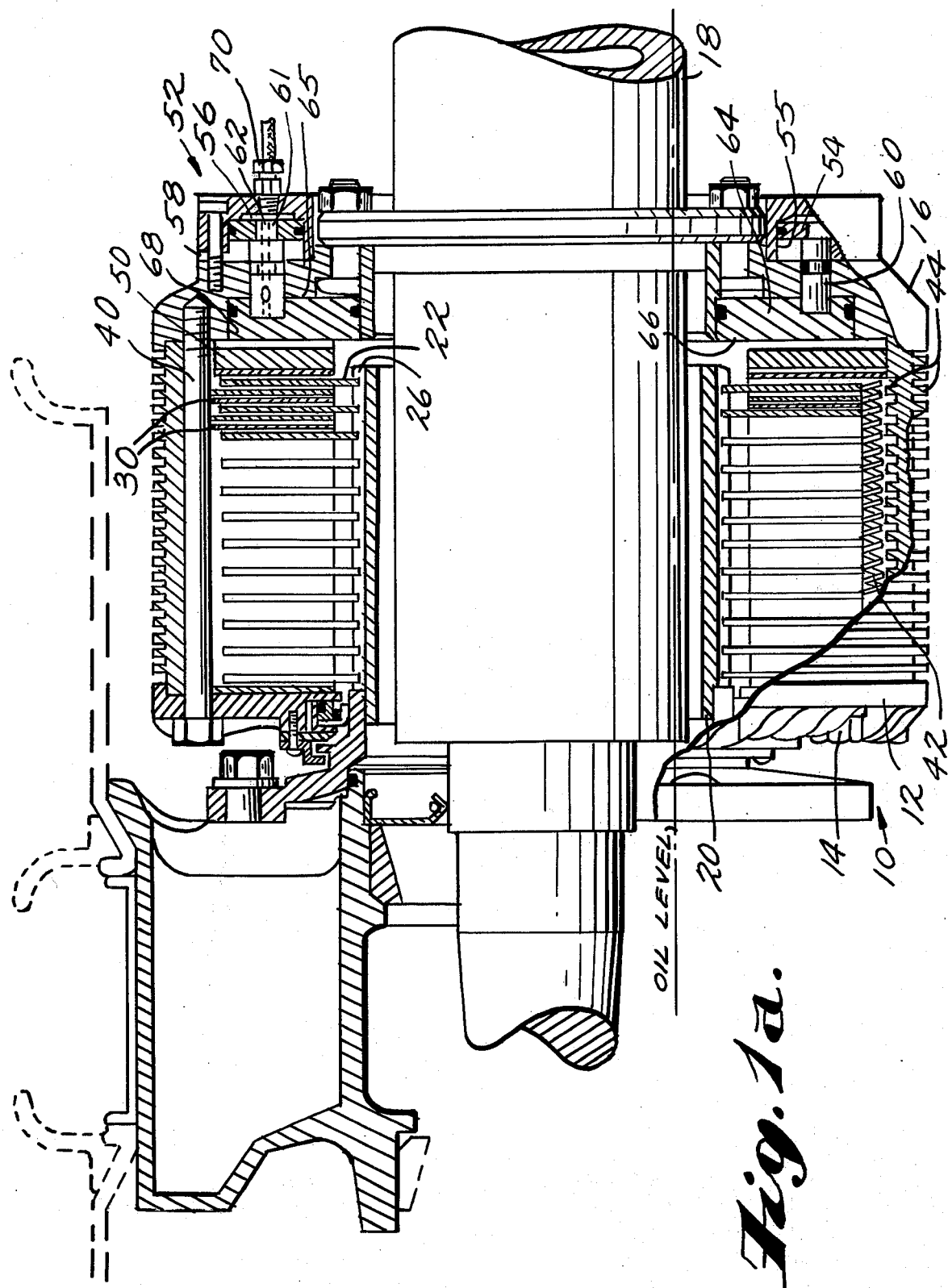
FIG. 1a is a side view — partly in section and partly in elevation — of an exemplary disc brake assembly with pneumatic actuator therefor according to the present invention, installed on a truck axle.

An exemplary heavy-duty disc brake assembly that may be pneumatically actuated according to the teachings of the present invention is shown generally at 10 in the drawings. A casing 12 having ends 14 and 16 thereof encloses all the components of the assembly. The casing 12 is adapted to be disposed around an axle 18 of a vehicle to be braked, such as a truck, trailer, or the like. The two ends 14 and 16 of the casing are spaced along the length of the axle 18 when the assembly 10 is disposed thereon. The casing 12 is preferably a self-contained unit, no connection with external radiator means or the like being required. The casing may be cast of aluminum or the like, as may the ends 14 and 16 thereof.

Disposed within the casing 12 are a plurality of rotor discs 22 juxtaposed with a plurality of stator discs 30. A sleeve 20 is operatively connected to axle 18 by any suitable means and the rotor discs in turn are operatively connected thereto for rotation therewith. Each rotor 22 may have a plurality of projections 24 formed thereon for cooperation with corresponding projections 26 formed on the exterior of the sleeve 20. The engagement of the projections 24, 26 allows movement of the discs 22 relative to the stator discs 30 along the length of the sleeve 20, parallel to the axis of rotation of said discs. Preferably, each of the rotors 20 has a plurality of generally radially extending grooves 28 formed in each face thereof, for a purpose to be later described.

Each of the stator discs 30 may consist of a pair of plates 32. Each of the plates 32 may have a plurality of projections 39 formed thereon for cooperation with a plurality of bolts 40 or the like, which bolts 40 may also serve to hold the casing ends 14 and 16 together. The interengagement with the projections 39 and the bolts 40 allows for longitudinal movement of the stators 30 along the lengths of the bolts 40 parallel to the axis of rotation of the discs 22. Each plate 32 has a smooth outer face 34 thereof for cooperation with a corresponding face of a rotor 22, and has an inner face 35 having a plurality of radial grooves 37 formed therein extending from the center to the periphery thereof. Interior faces 35 of a pair of plates 32 are placed together to form a stator disc 30 thereby. As shown in FIG. 5, the plates 32 may be arranged so that grooves 37 are staggered along the circumference thereof, or the grooves 37 of one plate may be aligned with the grooves of the other. While the grooves are shown as being semi-circular in cross section, they may be of many other shapes, including triangular. In fact no grooves need be provided at all, merely a porous material sandwiched between two smooth non-porous faces 34 being equivalent thereto for the purposes which will be hereinafter described.

A biasing means — such as spring(s) 42 or the like — is provided for biasing the rotor and stator discs to the normal widely spaced relative positions thereof shown in FIG. 1. The spring means 42 may be of any suitable construction providing biasing of the discs 22 and 30 away from each other. The side walls of the casing 12 are provided with projections 44, thereby providing a large surface area for the transfer of heat between the interior of the casing 12 and the exterior thereof, and providing an irregular surface for oil splashed thereagainst.

Cooling liquid, such as a sinterable oil (i.e., Shell THERMIA-33), is placed within the casing 12, preferably so that it fills about one-third thereof (dotted line in FIG. 1.) The disc brake assembly will not work properly if the casing 12 is completely full of oil, some open space being required therein. During operation of the assembly, the oil is entrained with air and assumes a froth form rather than remaining a pure liquid. In its froth form it serves as a more efficient means for heat transfer than if in the liquid form.

During braking, the rotors 22 and stators 30 are moved toward each other. During normal operation, however, the surfaces of the rotors and stators never actually come together (although braking still results if they do), however, a very thin film of oil always being provided therebetween, which contributes to the long life of the assembly 10. As the rotors 22 rotate, oil is splashed about the interior of the casing thereby. Oil adjacent the centers of the discs 22 is thrown by centrifugal force toward the periphery thereof. As the rotors and stators are brought closer together, a closed circulatory loop for the oil is effected. Oil between the discs is thrown outwardly by centrifugal force toward the projections 44 on the side walls of the casing 12, the grooves 28 in the discs 22 facilitating the radially outward movement thereof. When the oil hits the projections 44 it splatters, entraining air therewith, and providing an extremely efficient means for transferring heat therefrom to the casing 12. Also, the projections 44 provide a large surface area for transfer of heat from the interior of the casing 12 to the exterior thereof.

After the oil splatters against the projections 44 and after sufficient movement of oil from the center of the assembly toward the perimeter thereof, a negative pressure is created at the center of the assembly. This negative pressure provides a large enough force to draw some of the oil at the perimeter of the assembly through the grooves 37 formed interiorly of the stators 30 toward the center thereof. In this way a circulatory loop is established. It is noted that if the grooves 37 were provided in the exterior faces of plates 32 of the stators 30 instead of interiorly thereof, they would merely facilitate the centrifugal pumping action, and would not allow passage of the oil toward the center of the assembly. Thus, the oil would get too hot and sufficient cooling of the assembly 10 would not be provided, and operation of the brakes would be impaired and their life shortened. The circulatory loop that is established is shown by the arrows in FIG. 1a. It is to be noted that it is not necessary that all the stators 30 have interior grooves 37 or passageways therein, as long as enough passageways are provided for the interior movement of a sufficient quantity of oil, and as long as localized "hot spots" are avoided.

Movement of the discs 22 and 30 toward each other may be initiated by a stator 50 at the end 16 of the casing 12 having increased thickness for cooperation with pneumatic actuating means 52 and 100 according to the present invention. The pneumatic actuating means 52 or 100 actually provides the force for the relative movement between the discs 22 and 30.

Figure 2:
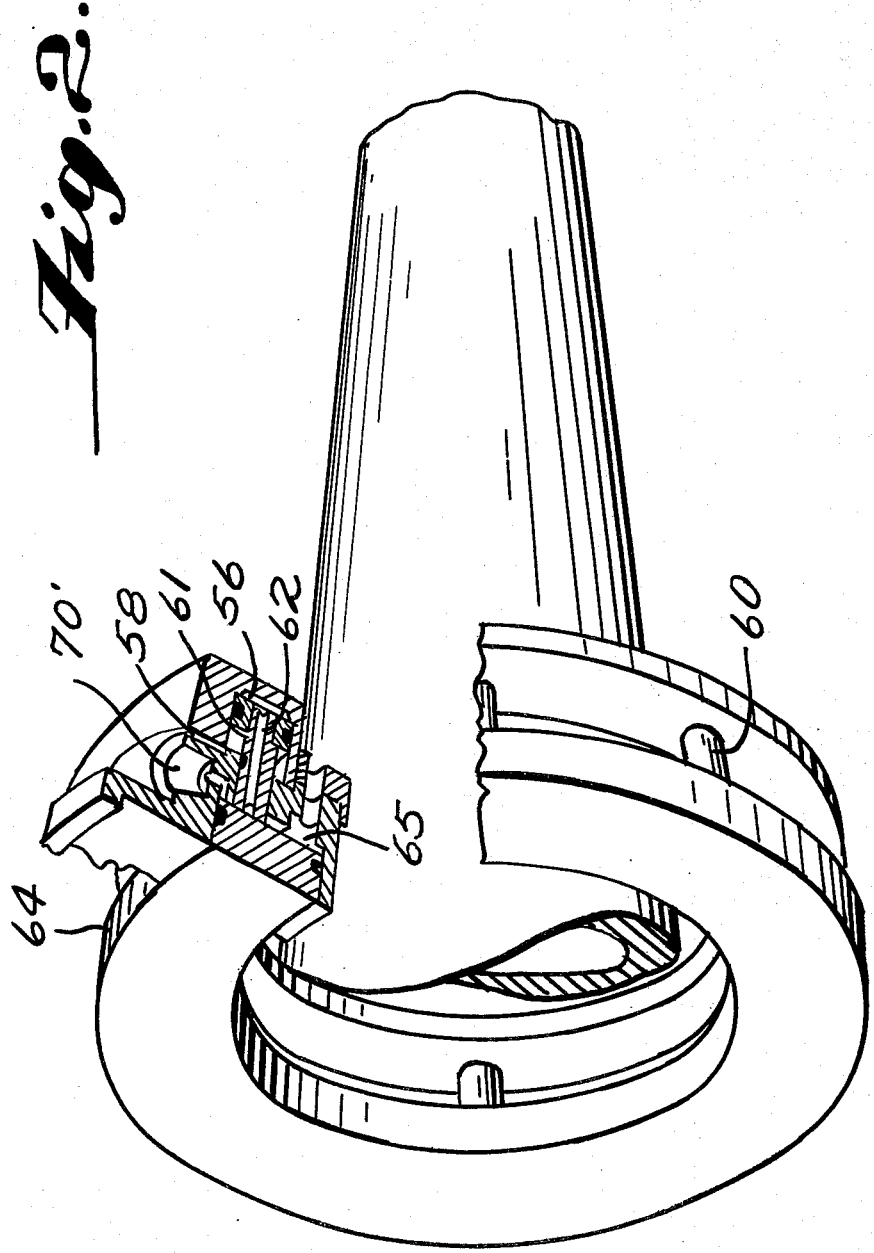
FIG. 2 is a detailed perspective view, partly in section, of a modified pneumatic actuator according to the present invention.

The pneumatic actuating means 52 shown in FIGS. 1a and 2 comprises a first piston 54 having a working face 56 thereof adapted to be exposed to air under pressure, and slidable in a cylinder 55. Both the piston 54 and the cylinder 55 are annular, being adapted to be disposed along with the rest of the assembly 10 around the axle 18 of a vehicle. An air vent 58 is provided in cylinder 55 in the portion thereof opposite the working face 56 of the piston 54 so that upon movement of piston 54 under the force of air under pressure to the left in FIG. 1a will not be opposed by any air pressure within the cylinder 55.

The first piston 54 is operatively connected by any suitable means — such as a plurality of rods 60 — to a second annular piston 64 slidable in annular cylinder 68, the cylinders 55 and 68 normally being distinct and the pistons 54 and 64 normally having differently dimensioned working face surface areas in order to provide maximum compactness of the actuating assembly 52 when in its operating environment. The piston 64 has a working face 65 thereof adapted to be exposed to air under pressure, and has a face 66 thereof opposite to working face 65 for making abutting engagement with terminal stator 50 for effecting relative movement between the rotors 22 and stators 30. One of the means for operatively connecting the piston 54 to the piston 64 includes a hollow rod member 61, having an air passageway 62 formed therethrough. Air introduced at the working face of either of the pistons 54 or 64 will be carried by passageway 62 to the working face of the other piston, whereby the effective surface area exposed to the pneumatic fluid will be the sum of the area of working face 56 of piston 54 and the area of working face 65 of piston 64. In this way, a large enough surface area is provided for operation of the assembly 10 by only pneumatic means while the casing 12 is not increased significantly in size, any size increase being along the length of the axle 18, and not interfering with the operation of the vehicle, nor increasing the bulk of the assembly.

Suitable sealing means are provided between pistons 54 and 64 in cylinders 55 and 68 and for thrust rods 60 and 61 to prevent leakage of air.

Air under pressure from a vehicle braking system may be introduced into the cylinders 55 and 68 by any suitable means, such as the air inlets 70 and 70' shown in FIGS. 1 and 2 of the drawings, respectively. Inlet 70 is disposed on the most remote portion of the casing end 16, and supplies air to the first piston 54 working face 56 initially, and then through passageway 62 to the working face 65 of second piston 64. Inlet 70' first supplies air to the working face 65 of second piston 54, and then through passageway 62 to the working face 56 of first piston 54.

Another form of pneumatic actuator that could be used for actuating an improved disc brake assembly according to a preferred embodiment of the invention for braking trucks and the like in conformance with the aforementioned Federal Regulations is shown generally at 100 in FIG. 1b. A casing end 116 is provided for the disc-brake assembly 10, the casing having a single annular piston 120 mounted in an annular cavity 118 therein, the direction of movement of said piston 120 being parallel to the axis of rotation of shaft 18.

The piston 120 is adapted to translate in an annular cavity 118 formed in casing end 116. Sealing means 119 are provided on piston 120 to provide fluid-tight chambers 126 and 128 on either side of piston 120. Means are provided for transferring the movement of piston 120 to stator 50 of brake assembly 10 to provide braking, said means preferably including a plurality (i.e., eight) of rods 122, each rod 122 being formed integrally with or attached to piston 120, and being translatable in a bore 123 formed in casing end 116. Sealing means 124 are provided between each rod 122 and its corresponding bore 123.

The piston 120 is normally biased to brake-actuating position (to the left in FIG. 1b) by spring biasing means in actuating chamber 128. The spring biasing means preferably take the form of a plurality (i.e., eight) of conical springs 130 disposed between piston 120 and casing plate 117 in chamber 128. It is preferred that conical springs be used in the interests of saving space. The size of the brake assembly 10 as a whole is important in providing braking for a truck or the like, and when conical springs are utilized the cavity 118 need not be as large as if conventional spiral coil springs were utilized since when the piston 120 is retracted (position shown in FIG. 1b) the thickness of only one coil of a spring 130 is disposed between the piston 120 and the plate 117, rather than the thickness of plurality of coils as with a spiral spring. Preferably the spring constants of the springs 130 are such that the springs supply about 60% of the maximum braking force necessary to actuate brake assembly 10. Thus it is required that only 60% (slightly more) of the force required to brake the assembly 10 be provided by air introduced into retraction chamber 126 to retract the piston 120, and that only 40% (or slightly more) of the force required to brake the assembly 10 be provided by air introduced into the actuating chamber 128 to actuate the brakes. The springs 130 also provide a fail-safe mechanism should the air pressure sources fail or be turned off, since the brakes will be applied with 60% maximum force (enough to stop the vehicle in emergency situations and/or to lock the wheels if the vehicle is parked on a grade) even without pressure.

Actuation and retraction of the piston 120 is provided by one or more sources of air under pressure. As shown in the drawings, a separate air supply (138 and 134) is provided for actuation and retraction, however only one source and a valving means may be provided if desired. One of the sources, 138, is connected via a passageway 136 to chamber 126, and the other source, 134, is connected via a passageway 132 to chamber 128. When vehicle operation is desired, air under pressure (great enough to compress springs 130) is supplied to chamber 126 while no air under pressure is supplied to chamber 128 (rather chamber 128 may be vented). This retracts piston 120, releasing the pressure on stator 50, and allowing rotation of axle 18. If braking of the vehicle is desired, air under pressure from source 134 is supplied to chamber 128 while no air is provided to chamber 126 (rather chamber 126 is vented). This moves the piston 120 to the left (as shown in FIG. 1b) resulting in relative movement of the rotors and stators, and consequently braking of the axle 18. It will thus be seen that only slightly more than 60% (or whatever force is selected for springs 130) of the braking force need actually be applied by the pneumatic means, making pneumatic braking practical.

A mechanical piston retractor 140 may be provided for the piston 120 should both the air sources 134, 138 fail and it is desired to move the vehicle. The retractor 140 merely consists of a plurality of sealed rods extending from the piston 120 to the exterior of the casing end 116. The rods 140 may be grasped by any suitable mechanical means and the piston 120 retracted (and latched in retracted position) thereby.

While the invention has been herein shown and described in what is presently conceived to be the most practical and preferred embodiment, it will be apparent to one of ordinary skill in the art that many modifications may be made thereof within the scope of the invention. For instance, other means for guiding the movement of the discs and mounting them for movement could be provided, as could other biasing means and other air inlet means. Other modifications are also possible, thus it is intended that the invention be given the broadest interpretation of the appended claims so as to encompass all equivalent structures and devices.

What is claimed is:

1. A heavy-duty disc brake assembly comprising:
    a. a plurality of stator discs,
    b. a plurality of rotor discs rotatable about an axis of rotation and juxtaposed with said stator discs,
    c. a casing containing said discs, said casing having two ends and being adapted to be disposed so that said two ends are spaced along the length of an axle of a vehicle on which said assembly is to be installed, said discs being disposed in said casing so that the disc surfaces thereof are perpendicular to said axis of rotation,
    d. means for mounting said rotor and stator discs for relative movement toward and away from each other and said ends of said casing along said axis of rotation between a first position wherein said rotor and stator discs are relatively widely spaced from each other and no braking action is provided thereby, to a second position wherein said rotor and stator discs are very close to or in engagement with each other and braking action is provided thereby, and
    e. means mounted at one end of said casing for moving said discs from said first position to said second position, said means including (i) a first annular piston disposed in an annular cylinder at said one end of said casing, said piston having a working face thereof adapted to be exposed to air under pressure and said cylinder having a vent at one end thereof opposite the working face of said first piston, (ii) a second annular piston disposed in an annular cylinder at said one end of said casing and having a working face thereof adapted to be exposed to air under pressure and an opposite face thereof adapted to be brought into operative engagement with one of said discs for effecting relative movement between all of said discs, (iii) means operatively connecting said first and second pistons together so that movement of one piston in one direction results in movement of the other piston in the same direction, said means including a plurality of rod means, (iv) an air passage extending from the working face of said first piston to the working face of said second piston through one of said rod means, and (v) means for connecting the working faces of said pistons to a source of air under pressure.

2. An assembly as recited in claim 1 wherein said means for connecting the working faces of said pistons to a source of air under pressure include an air inlet disposed at a remote portion of said one end of said casing directly adjacent the working face of said first piston.

3. An assembly as recited in claim 1 wherein said means for connecting the working faces of said pistons to a source of air under pressure include an air inlet disposed near said one end of said casing directly adjacent the working face of said second piston.

4. An assembly as recited in claim 1 wherein said cylinders for said first and second pistons are distinct and separate cylinders.

5. An assembly as recited in claim 4 wherein the working face surface area of said second piston is larger than the working face surface area of said first piston.

6. An assembly as recited in claim 1 wherein the working face surface area of said second piston is larger than the working face surface area of said first piston.

7. A pneumatically actuated liquid-cooled disc brake assembly comprising:
    a. a casing adapted to have a quantity of liquid disposed therein less than the liquid capacity of said casing, said casing adapted to be sealed for retention of said liquid quantity,
    b. a plurality of rotor discs mounted for rotation with respect to said casing about an axis of rotation within said casing,
    c. means for connecting said rotor discs to an external rotating body which is to be selectively braked,
    d. means for mounting said rotor discs for relative movement along the axis of rotation thereof,
    e. a plurality of stator discs disposed within said housing and having essentially flat, exterior disc surfaces, said flat disc surfaces thereof being arranged perpendicular to said axis of rotation,
    f. means for mounting said stator discs in juxtaposed relationship with respect to said rotor discs and for relative movement along the axis of rotation of said rotor discs while not allowing rotation of said stator discs,
    g. means for biasing said rotor and stator discs to a relatively widely spaced apart position whereby no braking action is performed therewith,
    h. heat exchanging means formed on casing portions that extend generally parallel to said axis of rotation, said heat exchanging means comprising a plurality of fins extending inwardly and outwardly from said casing and generally radially toward and away from said axis of rotation,
    i. means for establishing a closed circulatory loop for said cooling liquid during braking so that said cooling liquid is pumped outwardly from adjacent the axis of rotation of said rotor discs toward said casing heat exchanging means fins, splashing thereagainst and thereby frothing, and then is allowed to pass inwardly toward said axis of rotation in response to negative pressure adjacent said axis of rotation, said means including means defining interior passageways in at least one of said stator discs for the passage of liquid therethrough inwardly toward said axis of rotation, and
    j. pneumatically actuated means for effecting movement of said rotor and stator discs toward each other to effect braking action and effecting said closed circulatory loop, said pneumatically actuated means including (i) a first annular piston disposed in an annular cylinder at one end of said casing and having a working face thereof adapted to be exposed to air under pressure, (ii) a second annular piston disposed in an annular cylinder at said same end of said casing and having a working face thereof adapted to be exposed to air under pressure and an opposite face thereof adapted to be brought into operative engagement with one of said discs, (iii) means operatively connecting said first and second pistons together so that movement of one piston in one direction results in movement of the other piston in the same direction, (iv) passage means providing fluid communication between the working faces of said pistons, and (v) means for connecting the working faces of said pistons to a source of air under pressure.

8. An assembly as recited in claim 7 wherein said means operatively connecting said first and second pistons together comprises a plurality of rod means.

9. An assembly as recited in claim 8 wherein said passage means includes an air passage extending through one of said plurality of rod means.

10. An assembly as recited in claim 7 wherein said means for establishing a closed circulatory loop further includes a plurality of generally radially extending grooves formed in the surfaces of said rotor discs, whereby the self-pumping action of said rotor discs is increased.

11. An assembly as recited in claim 7 wherein said cylinders for said first and second pistons are distinct and separate cylinders.

12. An assembly as recited in claim 11 wherein the working face surface area of said second piston is larger than the working face surface area of said first piston.

13. An assembly as recited in claim 7 wherein the working face surface area of said second piston is larger than the working face surface area of said first piston.

* * * * *